(12) United States Patent
Badros et al.

(10) Patent No.: US 8,423,413 B2
(45) Date of Patent: Apr. 16, 2013

(54) ADVERTISEMENT APPROVAL

(75) Inventors: Gregory Joseph Badros, Mountain View, CA (US); Robert J. Stets, Palo Alto, CA (US); Lucy Zhang, Union City, CA (US)

(73) Assignee: Google Inc., Mountain View, CA (US)

( * ) Notice: Subject to any disclaimer, the term of this patent is extended or adjusted under 35 U.S.C. 154(b) by 2821 days.

(21) Appl. No.: 11/026,415

(22) Filed: Dec. 30, 2004

(65) Prior Publication Data

US 2006/0149623 A1 Jul. 6, 2006

(51) Int. Cl.
*G06Q 30/00* (2012.01)

(52) U.S. Cl.
USPC .............. 705/14.73; 705/14.4; 705/14.72

(58) Field of Classification Search ............ 705/14.4, 705/14.72, 14.73
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 2004/0003265 A1 | 1/2004 | Goodman et al. | |

FOREIGN PATENT DOCUMENTS

| | | |
|---|---|---|
| JP | 2002-189925 | 7/2002 |
| JP | 2005-536108 | 11/2005 |
| JP | 2006-500699 | 1/2006 |
| JP | 2006-518892 | 8/2006 |
| KR | 2003-0044189 | 6/2003 |
| KR | 2004-0002516 | 1/2004 |
| WO | WO 97/21183 | 6/1997 |
| WO | WO 2004/015519 | 2/2004 |
| WO | WO 2004/028234 | 4/2004 |
| WO | WO 2004/063882 | 7/2004 |

OTHER PUBLICATIONS

First Examination Report to Indian Patent Application No. 1119/MUMNP/2007, dated May 5, 2008 (1 pg.).
PCT International Search Report, for International Application No. PCT/US05/47154, mailed on Sep. 7, 2006. (3 pgs.).

(Continued)

*Primary Examiner* — Raquel Alvarez
(74) *Attorney, Agent, or Firm* — John C. Pokotylo; Straub & Pokotylo

(57) ABSTRACT

An advertisement for use with an online ad serving system may be automatically checked for compliance with one or more policies of the online ad serving system. If the advertisement is approved, then it is allowed by be served by the ad serving system. Follow up checks of the advertisement may be scheduled. One follow up check may be to test a landing page of the advertisement for compliance with policies. If the advertisement is not approved, hints for making the ad comply with one or more violated policies may be provided to an advertiser associated with the ad, and/or an ad serving system customer service representative. Determining whether or not to approve the advertisement may include determining violations of one or more policies by the advertisement, and, for each of the violations, determining whether or not to exempt the violation.

13 Claims, 10 Drawing Sheets

OTHER PUBLICATIONS

Written Opinion of the International Searching Authority, for International Application No. PCT/US05/47154, mailed on Sep. 7, 2006 (3 pgs.).
Notice of Preliminary Report for Korean Patent Application No. 10-2007-7017359, mailed Dec. 10, 2008 (8 pgs.) with translation (8 pgs.).
Examination Report for Indian Patent Application No. 1119/MUMNP/2007/817, dated Apr. 28, 2009 (1 pg.).
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www.Archive.org, Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., *Advertising on the Internet*, 2$^{nd}$ Ed., John Wiley & Sons, 1999.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Statement Regarding References in 1449 Form.
Re-Examination Report for Korean Patent Application No. 10-2007-7017539, mailed Nov. 26, 2010 (4 pgs.) with translation (4 pgs.).
Translation of Decision of Rejection for Japanese Patent Application No. 2007-549562, mailed Jan. 4, 2011 (4 pgs.).
Notice of Preliminary Rejection for Korean Patent Application No. 10-2009-7027157, mailed Apr. 6, 2011 (4 pgs.) with translation (6 pgs.).
Summons to Oral Proceedings for European Patent Application No. 05 855 672.1-2221, mailed Mar. 5, 2012 (4 pgs.).
Notice of Final Rejection for Korean Patent Application No. 10-2007-7017539, mailed Oct. 28, 2009 (3 pgs.) with translation (2 pgs.).
Supplementary European Search Report for European Patent Application No. 05855672.1, mailed Nov. 20, 2009 (4 pgs.).
Notification of First Office Action for Chinese Patent Application No. 200580048709.8, dated Apr. 13, 2010 (4 pgs.) with translation (4 pgs.).
Notice of Reasons for Rejection for Japanese Patent Application No. 2007-549562, mailed Apr. 27, 2010 (4 pgs.) with translation (5 pgs.).
"Secret of Internet Advertisement—Demerits of Internet Advertisement", [online], Dec. 14, 2004 [retrieved Apr. 19, 2010], the Internet <URL>: http://web.archive.org/web/20041214020956/http://www.netadreport.com/32.html>.
Zeff, Robbin, "Advertising on the Internet", first edition, published by Kabushiki Kaisha Ryutsu Kagaku Daigaku Shuppan, Feb. 26, 2001, pp. 55-58.
Notification of the Second Office Action for Chinese Patent Application No. 200580048709.8, mailed Jul. 14, 2011 (5 pgs.) with translation (7 pgs.).
Canadian Office Action for Canadian Patent Application No. 2,592,742, mailed Jan. 18, 2010 (5 pgs.).
Notice of Preliminary Rejection for Korean Patent Application No. 10-2007-7017539, mailed Feb. 1, 2010 (5 pgs.) with translation (5 pgs.).
Notice of Final Rejection for Korean Patent Application No. 10-2009-7027157, mailed Apr. 20, 2012 (3 pgs.) with translation (3 pgs.).
First Office Action for Japanese Patent Application No. 2011-103817, mailed Sep. 18, 2012 (3 pgs.) with translation (3 pgs.).
Miyake, Yasuo, "Newest Self-Defense Guidelines for Network Security, Software Design," Giivutsu-Hyohron Co. Ltd., No. 151, pp. 214-223 (May 18, 2003).

ADVERTISEMENT APPROVAL

§1 BACKGROUND OF THE INVENTION

1.1 Field of the Invention

The present invention concerns advertising. In particular, the present invention concerns processes for approving advertisements (referred to as "ads"), such as ads to be served with Web pages for example. The present invention also concerns enforcing policies on previously approved ads.

§1.2 Background Information

Advertising using traditional media, such as television, radio, newspapers and magazines, is well known. Recently, advertising over more interactive media has become popular. For example, as the number of people using the Internet has exploded, advertisers have come to appreciate media and services offered over the Internet as a potentially powerful way to advertise.

Web page-based ads (also referred to as "Web ads") are often presented to their advertising audience in the form of "banner ads" (i.e., a rectangular box that includes graphic components). When a member of the advertising audience (referred to as a "viewer" or "user" in the Specification without loss of generality) selects one of these banner ads by clicking on it, embedded hypertext links typically direct the viewer to a page (which may be referred to as the "landing page" of the ad) of the advertiser's Website where they can be presented with marketing information and/or consummate a transaction.

Typically, various Websites place Web ads from various advertisers on their Web pages. By charging a fee for such placements from the advertiser, the Website gets a source of income. Further, some entities accept ads from advertisers and supply those ads to other entities to place on their Web pages or page views of those Web pages. This is sometimes referred to as "syndication." Whether a Website serves ads on its own pages or on the pages of a syndication partner, such a Website may be referred to as an "ad network".

Before placing an ad on its own Website, or syndicating an ad to another's Website, it is important to review the ad to ensure that it is correct and appropriate. Such a review may be used to identify such things as incorrect punctuation, capitalization, grammar, text spacing, or price, to name just a few. Also, such a review may be used to identify forbidden text, unacceptable content, improper lists, repetition, inappropriate superlatives, promotional offers, or serving constraints (e.g., targeting keywords) that are too general, among other things.

In some current ad networks, the number of ads that need to be reviewed can easily reach the thousands or tens-of-thousands. A manual review process is expensive and time-consuming, and is prone to human error. Thus, an improved ad review process is desired.

§2 SUMMARY OF THE INVENTION

At least some embodiments consistent with the present invention may provide an improved ad review process by (a) accepting an advertisement for use with an online ad serving system, (b) automatically checking the advertisement for compliance with one or more policies of the online ad serving system, and (c) determining whether or not to approve the advertisement using results of the automatic checking. At least some of those embodiments may permit the advertisement to be served by the ad serving system if it was determined to approve the advertisement, and inhibit the advertisement from being served by the ad serving system if it was determined not to approve the advertisement. At least some other of those embodiments may provide hints for making the ad comply with one or more violated policies to an advertiser associated with the ad, and/or an ad serving system customer service representative, if it was determined not to approve the advertisement.

In at least some embodiments consistent with the present invention, the policies may include one or more of (A) prohibition of superlatives, (B) prohibition of repeated words, (C) prohibition of repeated phrases, (D) prohibition of trademarks, (E) prohibition of vulgar language, (F) prohibition of ad landing pages that generate pop-up ads, (G) prohibition of ad landing pages that disable a browser "back" function, (H) inappropriate capitalization, (I) prohibition of landing pages that cannot be viewed in a standard browser, (J) prohibition of multiple exclamation points, (K) prohibition of text that is too long, (L) landing page URL that does not match the visible URL spelling, and (M) prohibition of counterfeit design goods.

In at least some embodiments consistent with the present invention, if it was determined to approve the advertisement, then a follow up check of the advertisement is scheduled. For example, if the advertisement includes a link to a landing page, the follow up check may test the landing page for compliance with policies. In at least some embodiments consistent with the present invention, the policies may include ensuring that the ad landing page generates no pop-ups, and/or ensuring that the ad landing page does not disable a "back" operation in a browser.

In at least some embodiments consistent with the present invention, the act of determining whether or not to approve the advertisement using results of the automatic checking may include determining violations of one or more policies by the advertisement, and for each of the violations, determining whether to exempt the violation. In at least some embodiments consistent with the present invention, the determination of whether or not to exempt a violation uses a whitelist of one or more violation exemptions to be applied on a per language basis, a per advertiser basis, a per ad group basis, and/or a per ad campaign basis.

§3 BRIEF DESCRIPTION OF THE DRAWINGS

§4 DETAILED DESCRIPTION

Figure 1:
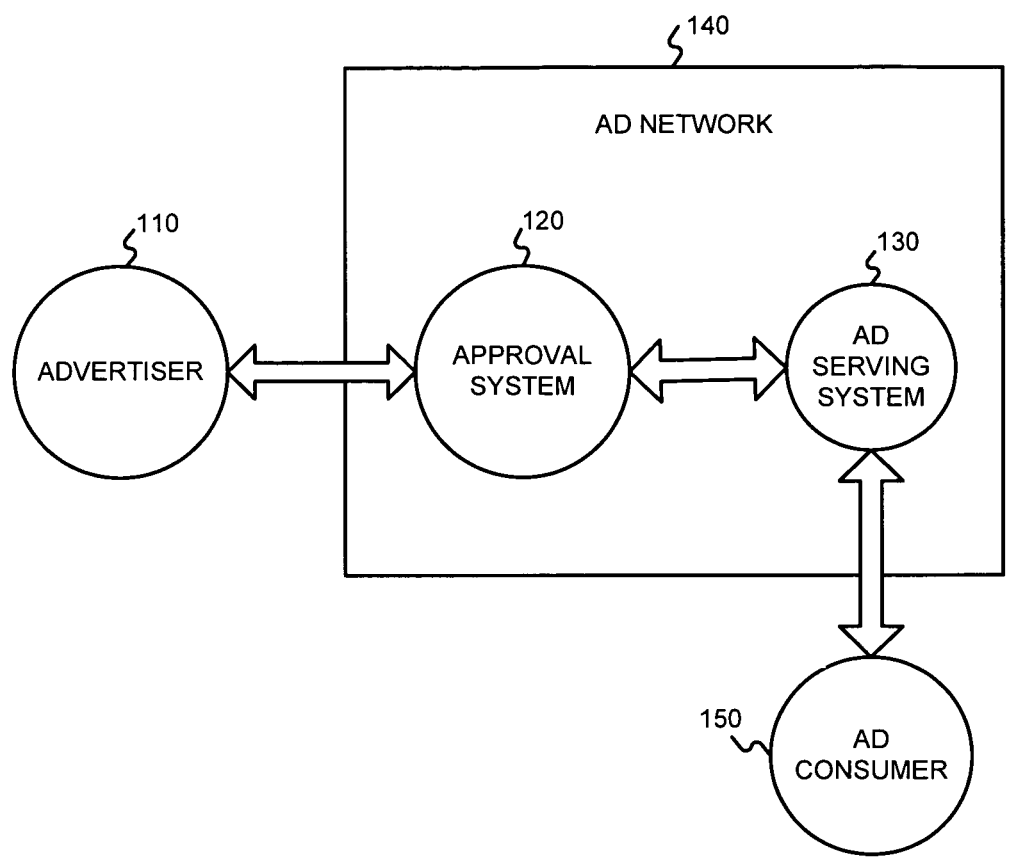
FIG. 1 is a diagram illustrating entities that may participate in an automated ad approval process.

The present invention may involve novel methods, apparatus, message formats and/or data structures for helping an ad network to at least partially automate the process of approving ads for circulation/syndication, and/or to recheck ads that have already been approved. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, terms that may be used in the specification are defined in §4.1. Then, environments in which, or with which, the present invention may operate are described in §4.2. Thereafter, exemplary embodiments of the present invention are described in §4.3. An example illustrating operations in an exemplary embodiment of the present invention is provided in §4.4. Finally, some conclusions regarding the present invention are set forth in §4.5.

§4.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications. Further, in some systems, an advertiser may specify that its ad is to be served only to (or is not to be served to) user devices having certain characteristics.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Mozilla), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.2 Environments in which, or with which, the Present Invention may Operate

FIG. 1 illustrates an exemplary environment in which the present invention may be used. The components shown may be able to communicate with one another, such as via a network or internetwork (not shown), for example. Each of one or more advertisers 110 has ads they would like to present to potential customers (not shown). An ad network 140 places the ads in circulation where the potential customers, such as individuals using and viewing the Web pages of ad consumer 150, can see the ads. The advertiser(s) 110 typically compensates, either directly or indirectly via the ad network 140, the ad consumer 150 for this opportunity to have its ads rendered to potential customers. Further, the ad network 140 may sell ads, with or without additional software to control the placement of the ads, to other ad consumers 150 (e.g., other Website providers). This is sometimes referred to as "syndication."

Ad network 140 may advantageously use an approval system 120 to review the submitted ads before such ads can be delivered with pages on its 140 Website or on the Website of a syndicated ad consumer. This review is generally a manual operation in which employees or agents of ad network 140 examine each ad for problems. Such problems may include incorrect punctuation, capitalization, grammar, spelling, or spacing. Other examples of problems may include incorrect prices or forbidden text. Still other examples may include inappropriate content, lists, superlatives, promotional offers, competitive claims, inappropriate products, inappropriate services and repetition.

Further, ads may include serving constraints (e.g., targeting keywords) used to determine when it is appropriate to serve the ads. For example, if a user performed an online search for a Toyota car, Toyota advertisements, including the targeting keyword "Toyota," might be placed on the search results page. This is one way that the ad network 140 can place many ads on various page views that are seen by many different users. However, if the targeting keywords requested by advertiser 110 are too general, the ads of that advertiser might be served too often. This might lead to a poor user experience, as well as poorly monetized ads and page views. Therefore, the manual review of the submitted ads in approval system 120 may include identifying such "too general" targeting keywords (or some other serving constraint(s)) as problems, and not approve those ads for use by content provider 140.

In one embodiment consistent with the invention, the ad approval system 120 is at least partially automated and uses policy rules. Although such a system may be almost completely automated, humans (ad delivery system customer service representatives) may over-ride an automated determination (approve, disapprove, warn, etc) of an ad.

Once an ad is approved, it may be made available for serving by an ad serving system 130. When served, the approved ads are placed on ad spots of page views from the ad network's 140 own Websites, or are syndicated for placement on ad spots of page views of other content providers' Websites.

§4.3 Exemplary Embodiments

As will be described below, various embodiments consistent with the present invention may include one or more of (a) systems to support automatically checking ads against policy rules, (b) systems to help advertisers to submit ads that conform to policy rules, correct ads that fail to comply with one or more policy rules, and/or request exemptions from such policy rules, and (c) systems to help ad delivery system customer service representatives ensure that ads conform to policy rules, correct ads that fail to comply with one or more policy rules, approve or disapprove ads, and/or approve or disapprove exemption requests. Some embodiments consistent with the present invention may only include one of the foregoing systems. Other embodiments consistent with the present invention may include two of the foregoing systems. Still other embodiments consistent with the present invention may include all three of the foregoing systems. Some embodiments, consistent with the present invention, that include two or three of the foregoing systems may include components that are shared by two or more of the foregoing systems.

Figure 2:
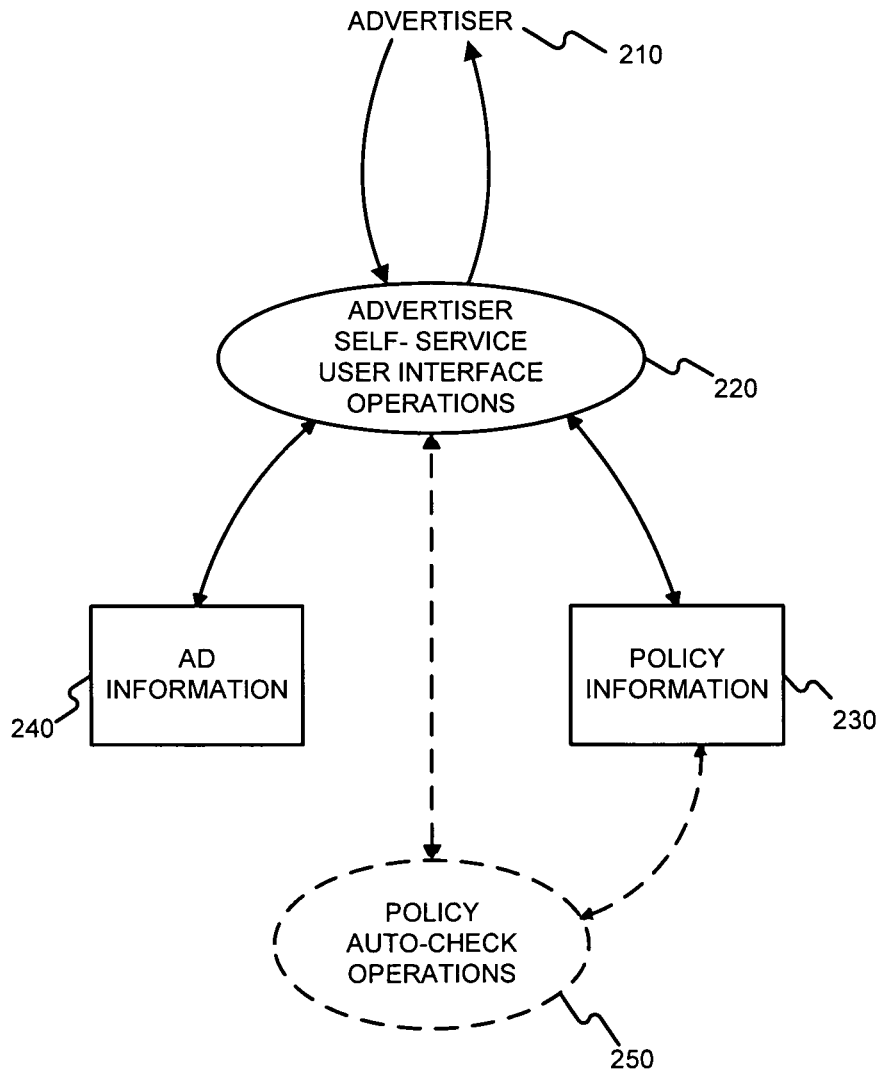
FIG. 2 is a bubble diagram illustrating operations that may be performed, and information that may be generated, used, and/or stored, by an advertiser self-service user interface ad approval system consistent with the invention.

FIG. 2 is a bubble diagram illustrating operations that may be performed, and information that may be generated, used, and/or stored, by an automated ad policy checking system that includes an advertiser self-service user interface, in a manner consistent with the present invention. Advertiser 210 can submit (new or modified) ads, and/or exemption requests via the advertiser self-service user interface operations 220. The advertiser self-service user interface operations 220 may use policy information 230 (and perhaps ad information 240) to determine whether to (a) approve a submitted ad, (b) disapprove a submitted ad, (c) pass a submitted ad (perhaps annotated with hints or suggestions for correcting problems) to an ad delivery system customer service representative or back to the advertiser, and/or (d) warn the advertiser that its ad will not be approved unless it obtains an exemption request (and perhaps passes an exemption request to an ad delivery system customer service representative). The advertiser self-service user interface operations 220 may also (a) pass an exemption request from an advertiser to an ad delivery system customer service representative, and/or (b) provide a decision on an exemption request to the advertiser. The foregoing operations may be performed by the advertiser self-service user interface operations 220 themselves. Alternatively, some or all of the foregoing operations may be performed by separate policy auto-check operations 250 (which may be shared and used by a number of different systems).

The policy information 230 may contain policy rules to be enforced on new or modified ads (e.g., submitted by the advertisers), and/or current ads that are active (i.e., ads that have previously been approved for delivery by the ad delivery system). The policy information 230 may also include suggestions for correction, exemptions (referred to as "whitelists" below without loss of generality), etc. The policy information 230 may include simple rules. For example, an ad creative may be checked for spelling, spacing, capitalization, inappropriate text, trademark violations, etc. Some or all of the policy information 230 may be shared and used by a number of different systems.

The ad information 240 may include a database with stored ads, along with pertinent information, that are available for delivery by an ad delivery system. The ad information 240 may also include approval bins that contain submitted ads waiting to be examined for approval (e.g., by an automated approval system, or by humans).

In view of the foregoing, the advertiser 210 can receive suggestions or hints about how to correct an ad, correct a submitted ad so that it conforms to the policy rules of the advertising system, and/or to request an exemption to one or more policies.

Figure 3:
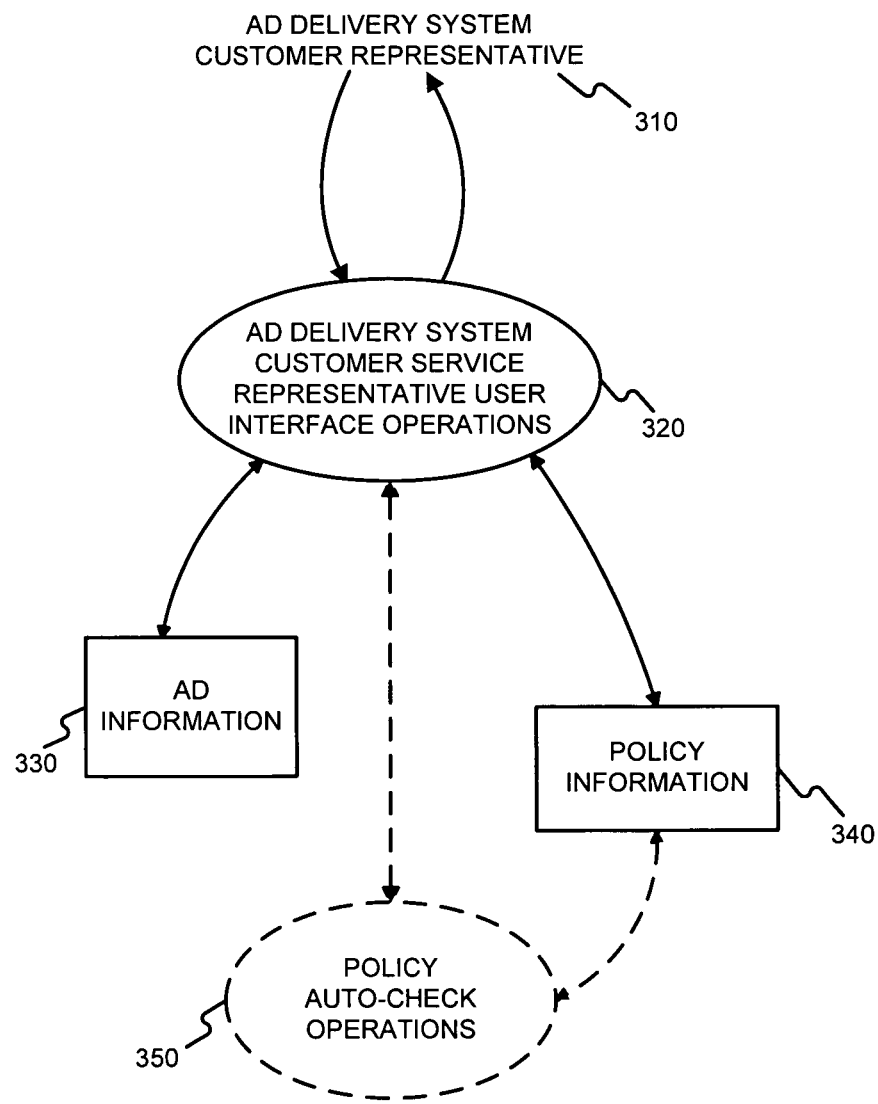
FIG. 3 is a bubble diagram illustrating operations that may be performed, and information that may be generated, used, and/or stored, by an ad delivery system customer service representative user interface ad approval system consistent with the invention.

FIG. 3 is a bubble diagram illustrating operations that may be performed, and information that may be generated, used, and/or stored, by an automated ad policy checking system that includes an ad delivery system customer service representative interface consistent with the present invention. Ad delivery system customer service representative 310 can (a) retrieve ads, (b) retrieve exemption requests, (c) enter and/or send ad approvals and/or ad disapprovals, and/or (d) enter and/or send exemption approvals and/or exemption disapprovals, via the ad delivery system customer service representative user interface operations 320. The ad delivery system customer service representative user interface operations 320 can obtain policy rules and other pertinent information from policy information 340.

The ad delivery system customer service representative 310 can check the status of an ad, whether active or just submitted, and ultimately make a final decision as to whether the ad can be approved or not. The ad delivery system customer service representative 310 can (a) retrieve ads stored in an approval bin included in the ad information 330, (b) receive annotated ads from other systems (such as the advertiser self-service user interface operations 220 introduced above with reference to FIG. 2, or auto check operations 410, introduced below with reference to FIG. 4), and/or (c) receive exemption requests.

The foregoing operations may be performed by the ad delivery system customer service representative user interface operations 320 themselves. Alternatively, some or all of the foregoing operations may be performed by separate policy auto-check operations 350 (which may be shared and used by a number of different systems).

As was the case with the policy information 230 of FIG. 2, the policy information 340 may include policy rules to be enforced on new or modified ads (e.g., submitted by the advertisers), and/or current ads that are active (i.e., ads that have previously been approved for delivery by the ad delivery system). The policy information 340 may also include suggestions for correction, exemptions (referred to as "whitelists" below without loss of generality), etc. The policy information 340 may include simple rules. For example, an ad creative may be checked for spelling, spacing, capitalization, inappropriate text, trademark violations, etc. Some or all of the policy information 340 may be shared and used by a number of different systems.

As was the case with the ad information 240 of FIG. 2, the ad information 330 may include a database with stored ads, along with pertinent information, that are available for delivery by an ad delivery system. The ad information 330 may also include approval bins that contain submitted ads waiting to be examined for approval (e.g., by an automated approval system, or by humans).

In view of the foregoing, the ad delivery system customer service representative 310 can retrieve or receive ads, correct a submitted ad so that it conforms to the policy rules of the advertising system, approve or disapprove an ad, and/or approve or disapprove a request for an exemption to one or more policy rules.

Figure 4:
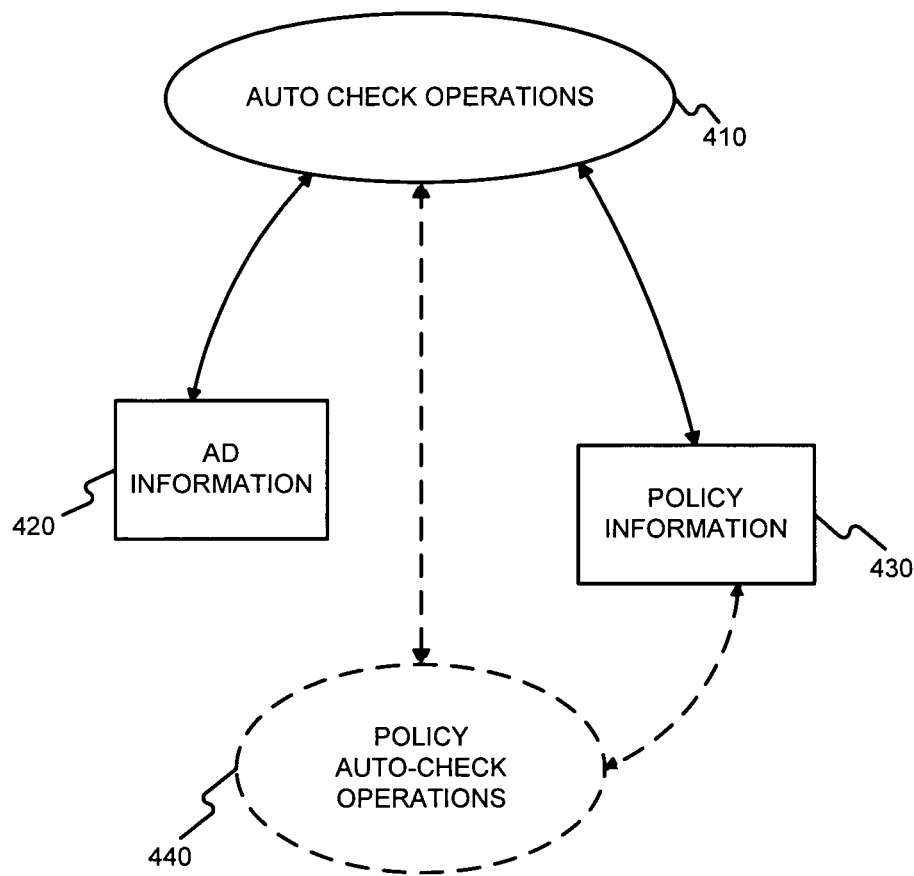
FIG. 4 is a bubble diagram illustrating operations that may be performed, and information that may be generated, used, and/or stored, by an automated ad approval system consistent with the invention.

FIG. 4 is a bubble diagram illustrating operations that may be performed, and information that may be generated, used, and/or stored, by an automated ad policy check system consistent with the present invention. The auto-check operations 410 may (a) retrieve ads from an approval bin included as ad information 420 (b) approve a new and/or modified ad, (c) disapprove a new and/or modified ad, (c) pass a new and/or modified ad (perhaps annotated with hints or suggestions to make the ad comply with one or more policies) to an advertiser and/or an ad delivery system customer service representative, and/or (d) recheck previously approved ads. The auto-check operations 410 may use policy information 430 when checking ads.

The foregoing operations may be performed by the auto-check operations 410 themselves. Alternatively, some or all of the foregoing operations may be performed by separate policy auto-check operations 440 (which may be shared and used by a number of different systems).

As was the case with the policy information 230 and 340 of FIGS. 2 and 3, respectively, the policy information 430 may include policy rules to be enforced on new or modified ads (e.g., submitted by the advertisers), and/or current ads that are active (i.e., ads that have previously been approved for delivery by the ad delivery system). The policy information 430 may also include suggestions for correction, exemptions (referred to as "whitelists" below without loss of generality), etc. The policy information 430 may include simple rules. For example, an ad creative may be checked for spelling, spacing, capitalization, inappropriate text, trademark violations, etc. Some or all of the policy information 430 may be shared and used by a number of different systems.

As was the case with the ad information 240 and 330 of FIGS. 2 and 3, respectively, the ad information 420 may include a database with stored ads, along with pertinent information, that are available for delivery by an ad delivery system. The ad information 420 may also include approval bins that contain submitted ads waiting to be examined for approval (e.g., by an automated approval system, or by humans).

In view of the foregoing, the auto-check operations 410 may be used to automatically check new and modified ads for compliance with policies. Auto check operations 410 allow previously approved ads to be checked against any new policy requirements (e.g., policy requirements enacted after the approval of the ad), and/or persistent policies (e.g., checking an ad landing page, which may be changed without modifying the ad).

Ads can be checked at various times in a manner consistent with the present invention. For example, an ad may be checked upon the occurrence of one or more of the following: (i) when an advertiser submits an ad group (e.g., via an advertiser self-service user interface); (ii) when a bulk-upload tool is used to submit ads (e.g., via auto-check operations); (iii) when a change to an ad or policy is entered; (iv) when a customer service representative investigates an ad (e.g., via a customer service representative user interface); and (v) at arbitrary times while the ad is running (e.g., using a persistent policy validation system)

§4.3.1 Exemplary Methods

Figure 5:
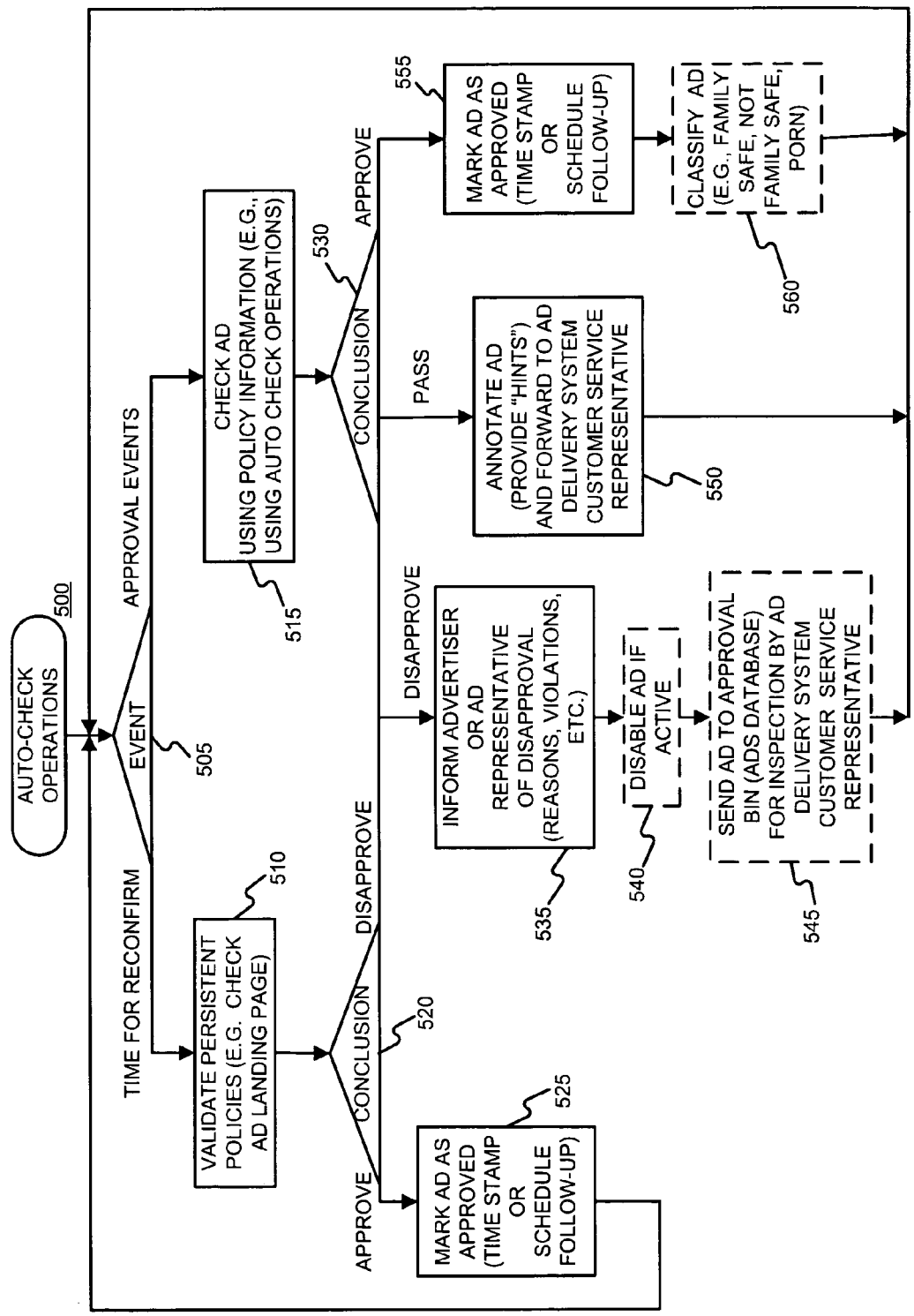
FIG. 5 is a flowchart illustrating an exemplary method that may be used to automatically process ads to determine whether to approve or decline the ads in a manner consistent with the present invention.

FIG. 5 is a flowchart illustrating an exemplary method 500 that may be used to automatically check ads in a manner consistent with the present invention. Different branches of the method 500 may be performed in response to different events that can occur. (Block 505) One event can be the receipt of a request for an ad approval (e.g., stored in an ad approval bin). Upon the occurrence of this event, the ad is checked using the policy information. (Block 515) After checking the ad at block 515, the method 500 can reach one of three conclusions. (Block 530) The ad can be approved, disapproved, or passed. If the ad is approved, the ad is marked as approved and may be time stamped or scheduled for a follow-up check. (Block 555) Also, when the ad is approved, it may be classified (e.g., family safe, not family safe, porn). (Block 560) If the ad is passed, it is annotated to provide hints as to what policy rule might be violated, and forwarded to an ad delivery system customer service representative for further inspection. (Block 550) Finally, if the ad is disapproved, the advertiser and/or ad representative may be informed (e.g., via e-mail) of the disapproval, and may possibly be informed of the reasons for the disapproval. (Block 535) The ad may be disabled if active. (Block 540) It may be forwarded to an approval bin in the ads database for later inspection by an ad delivery system customer service representative. (Block 545)

Referring back to event block 505, if it is time to reconfirm an active ad, persistent policies are checked (e.g., examination of the landing page). (Block 510) After checking an active ad at block 510, the method 500 may reach one of two conclusions. (Block 520) The ad may be approved or disapproved. If the ad is approved, it is marked as approved and may be time stamped or scheduled for a follow-up check. (Block 525) If the ad is disapproved, the method 500 may proceed to block 535 (already described above).

Referring back to blocks 555 and 525, when an ad is marked as approved, it may also be time stamped or scheduled for a follow-up check. Such a follow-up check may reconfirm existing and new policy rules (thereby ensuring consistency), and/or to enforce persistent policies. By time stamping the ad, other approval systems know when (and perhaps by whom) the ad was last examined and approved.

Referring back to block 515, the ad may be checked against the policy rules of the advertising system using auto policy check operations (that may be used by various operations).

Referring back to block 535, if an ad is disapproved, the method 500 may notify the advertiser or ad customer representative of the disapproval, for example via e-mail. The e-mail may explain the number and type of violations, along with suggestions for compliance.

Referring back to block 540, if the ad is active, the advertiser may be given a grace period to modify the ad to conform to the advertising system's policy rules before the ad is disabled.

Referring back to block 510, one important persistent policy to be checked is the landing page (destination page) of the ads. Two exemplary requirements for an ad landing page are (1) that they not use pop-ups and (2) that they preserve the function of the "Back" browser button. This check can be performed using a server designed to discover these and numerous other destination page properties. These destination page properties are then used to discover if any of the policy rules, such as the two rules just mentioned, of the advertising system are violated. This type of persistent policy validation is performed by the method 500 such that the advertising system can monitor the advertiser's ad landing pages and ad changes.

In at least some embodiments consistent with the present invention, the auto-check method 500 will be especially conservative with respect to classifying ads as approved or disapproved, and may often pass the ads as an opportunity to use humans to confirm its actions and gain feedback about where the system needs adjustments.

In at least some embodiments consistent with the present invention, a trust score for each advertiser can be used for further influencing the decision of the auto-check method 500. For example, the advertisers can be tracked by the advertising system and be given a trust score based on the performance and approvals past ads. In such embodiments, the auto-check method 500 may choose to avoid automatic disapprovals for trusted advertisers, and/or avoid automatic approvals for advertisers with low trust scores.

Figure 6:
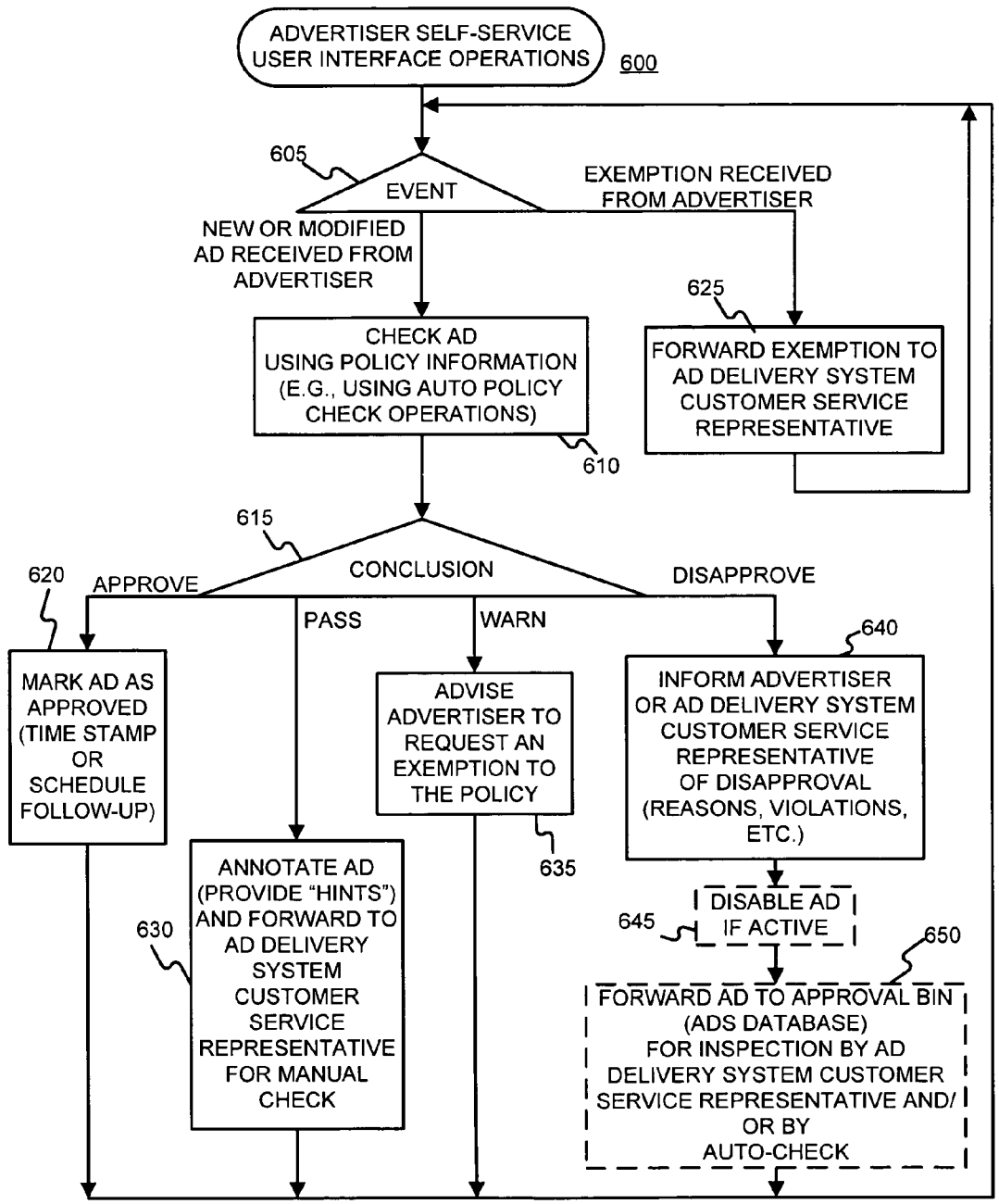
FIG. 6 is a flowchart illustrating an exemplary method that may be used to automatically provide an advertiser self service user interface to help preprocess ads to determine whether to approve or decline ads, in a manner consistent with the present invention.

FIG. 6 is a flowchart illustrating an exemplary method 600 that may be used to provide an advertiser self-service user interface for ad approval in a manner consistent with the present invention. Different branches of the method 600 may be performed in response to the occurrence of different events. (Block 605) Either a new or modified ad, or and exemption request is received from an advertiser. Regardless of whether the submitted ad is new or modified it is checked using policy information. (Block 610) After checking the ad at block 610, the method 600 can reach one of four conclusions—approve, disapprove, warn, or pass. The method 600 performs different acts depending on the conclusion reached. (Block 615)

If the ad is approved, the ad may be marked as approved. Further, the ad may be time stamped or a follow-up scheduled. (Block 620)

If the ad is passed, it may be annotated to provide hints as to what rule might be violated, and forwarded to an ad delivery system customer service representative for manual inspection. (Block 630)

If the conclusion is warn, an exemption may be requested from an advertiser. (Block 635)

Finally, if the ad is disapproved, the advertiser and/or ad delivery system customer service representative may be informed of the disapproval. (Block 640) Further, the ad may be disabled if active. (Block 645) Alternatively, the ad may be forwarded to an approval bin (in the ads database) for inspection by an ad delivery system customer service representative and/or auto-check operations. (Block 650)

Referring back to event block 605, if an exemption (e.g., responsive to the request made at block 635) is received, the ad may be forwarded to the ad delivery system customer service representative for inspection. (Block 625)

Referring back to block 620, when an ad is marked as approved, it may also be time stamped or scheduled for a follow-up check. Such a follow-up check may reconfirm existing and new policy rules (thereby ensuring consistency) and/or to enforce persistent policies. By time stamping the ad, other approval systems know when (and perhaps by whom) the ad was last examined and approved.

Referring back to block 635, when a warning is issued by the method 600, it prompts the advertiser for an exemption request indicating the number and type of violations of the ad. The advertiser can then submit an exemption request that is forwarded to an ad delivery system customer service representative for review. (Recall, e.g., decision block 605 and block 625.).

Referring back to block 610, the ad submitted by the advertiser is checked using policy information of the advertising system. The number and type(s) of violation(s), if any, are determined for the ad submitted by the advertiser. In an alternative embodiment, the ad may be checked using auto policy auto check operations (that may be used by various operations).

Figure 7:
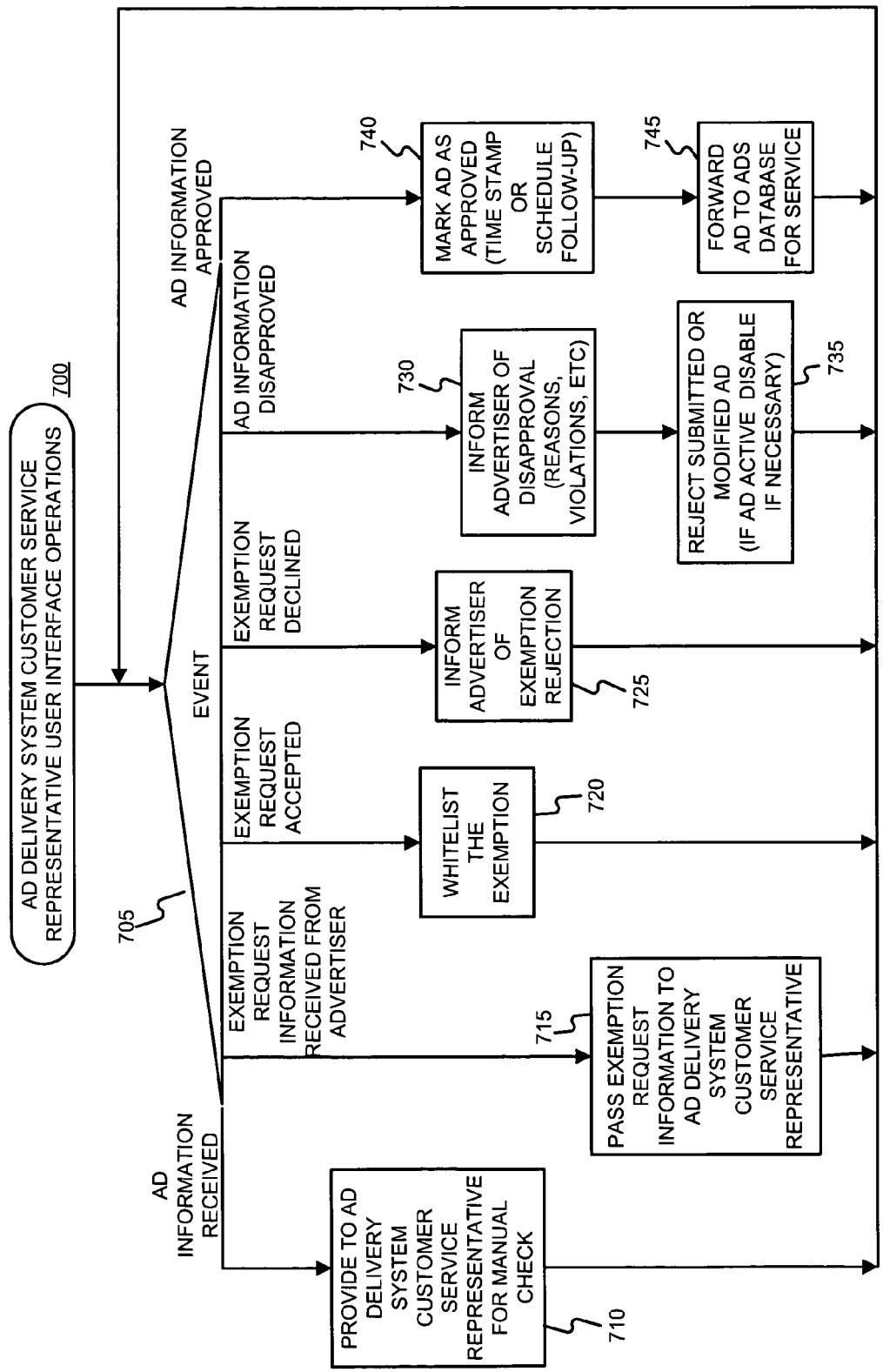
FIG. 7 is a flowchart illustrating an exemplary method that may be used to provide an ad delivery system customer service representative user interface to help manually process ads to determine whether to approve or decline ads, in a manner consistent with the present invention.

FIG. 7 is a flowchart illustrating an exemplary method 700 that may be used to help an ad delivery system customer service representative to manually process ads and manually process exemption requests in a manner consistent with the present invention. Various branches of the method 700 may be performed in response to the occurrence of various events. (Block 705) The method 700 can examine an ad in the ads database upon request (not shown) by the ad delivery system customer service representative. Thus, ad delivery system customer service representative can examine ads previously examined by the auto-check operation, examine ads previously examined by the advertiser serf-service user interface operations, or it can examine ads that have never been examined by any approval system.

Referring back to event block 705, if ad information is received, the method 700 simply forwards such information to the ad delivery system customer service representative for manual review and approval. (Block 710) Once the ad has been reviewed by the ad delivery system customer service representative, it may be accepted or declined. Referring to event block 705, if the ad information is disapproved, the ad delivery system customer service representative may inform the advertiser of the disapproval. (Block 730) This may include detailed information regarding the disapproval such as, reasons, violations, number and type of violations, etc. Furthermore, the method 700 may reject the submitted or modified ad and if active, the method 700 may disable the ad. (Block 735) Referring back to event block 705, if the ad information is approved, the ad may be marked as approved. (Block 740) The ad may also be time stamped, or a follow-up check may be scheduled. Furthermore the ad may be forwarded to the ads database for serving by the ad delivery system. (Block 745)

If exemption request information (submitted by the advertiser) is received (through the advertiser user interface), the method 700 may simply forward the exemption request to the ad delivery system customer service representative. (Block 715) Once the exemption is reviewed, by the ad delivery system customer service representative, the exemption request may be accepted or declined. Referring to event block 705, if the exemption request is accepted, the violation pertinent to the exemption request may be whitelisted. (Block 720) (The term whitelist will be explained later.) If, on the other hand, the exemption request is declined, the advertiser may be informed of the exemption rejection. (Block 725)

§4.3.2 Exemplary Data Structures for Policy Information

Figure 8:
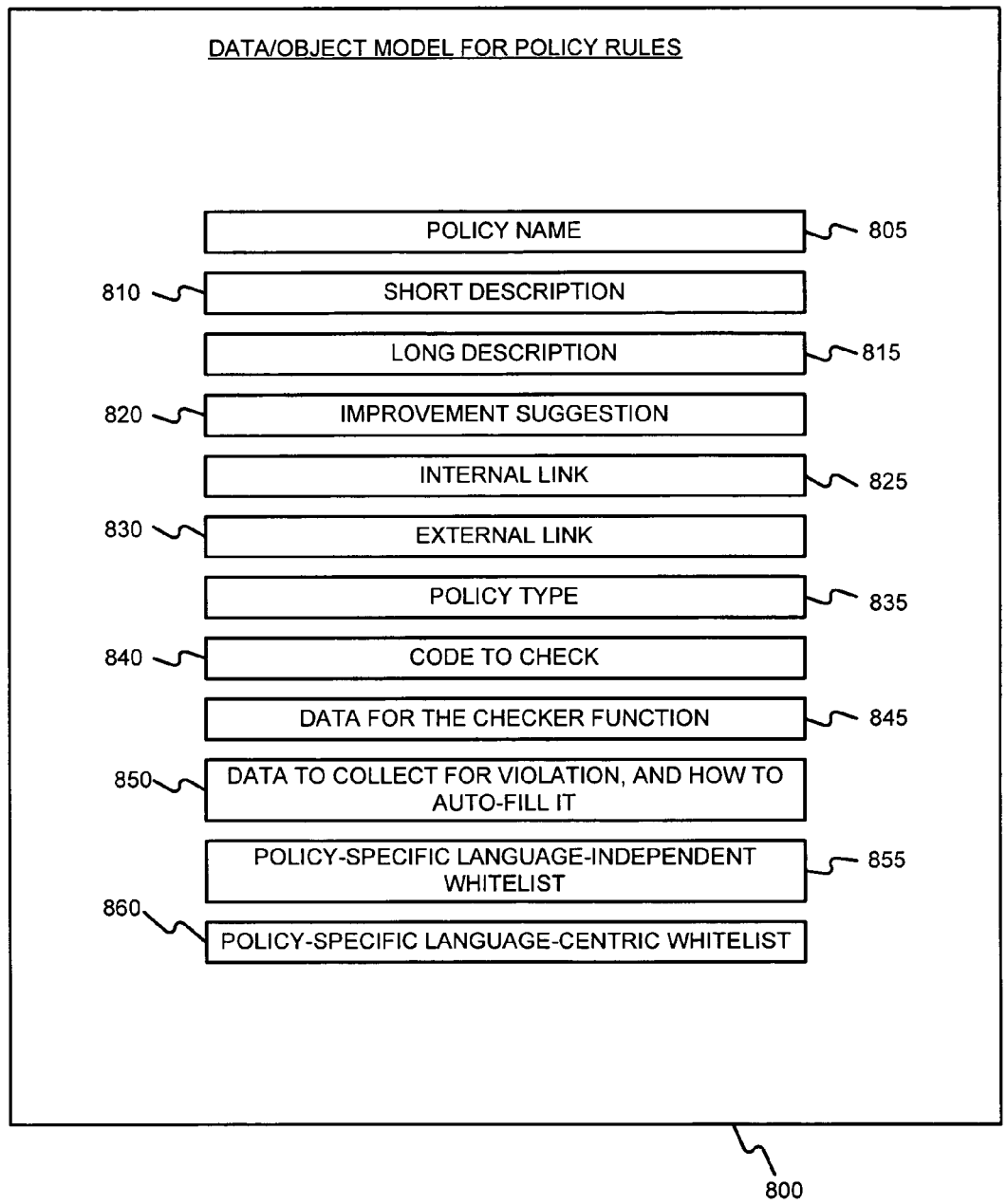
FIG. 8 is a diagram of an exemplary data structure that may be used to store policy rules used to determine ad violations in a manner consistent with the present invention.

FIG. 8 is an exemplary data structure for storing policy rules used to determine ad violations in a manner consistent with the present invention. According to the exemplary data structure 800, policies may include a fairly large amount of data. This data and other relevant information may be stored in database tables, such that database operations can be used to access, store, modify, etc., the data. As shown, the data structure 800 for each rule may include one or more of a policy name 805, a short description 810, a long description 815, an improvement suggestion 820, an internal link 825, an external link 830, a policy type 835, code to check 840, checker function data 845, data to collect for violation and how to fill it 850, a policy-specific, language independent whitelist 855, and a policy-specific language-centric whitelist 860. Each of these fields is described below.

"Policy name" field 805 is used as the primary key for referencing the policies in the database. For example a policy could be named "no-repeated-words". "Short description" field 810 is a short description explaining the violation made. For instance, the short description could be "Text-Repetition: {WORD}", indicating that a word has been repeated in the text of the ad. Note that there is one description per language. "Long description" field 815 is a long description explaining the violation made. As an example, the description could read as "The following word or phrase is unnecessarily repeated in your ad: "{WORD}". Your limited ad space . . . " "Improvement suggestion" field 820 may contain suggestions explaining how to improve the ad and avoid violations. As an example, the suggestion could read as "Rewrite without repeating the word {WORD}". Note that the above descriptions and suggestions are available as one per language. The "internal link" field 825 may contain data with internal links that are available only to personnel within the advertising system such as ad delivery system customer service representative. The ad delivery system customer service representative may use the links to access information regarding a violation or get other relevant information. For example, the internal links could be linked to editorials explaining the policies, which the ad representatives may use for clarifications. The "external link" field 830 may contain data with external links that are available to advertisers. The advertisers may use the links to access information regarding a violation or other relevant information. For example, the external links may be linked to advertising system Web-pages that include guidelines explaining a violation committed and how to avoid and/or correct it. The "Policy Type" field 835 specifies what an ad needs in order to be reviewed and where in the ad it is needed. Policies may be applied to a number of places such as the creative. Policies applied towards the creative may be designated as of type "C" (e.g., special rules for title (1st line), special rules for body (2-3 lines), special rules for visible URL (4th line) in the context of text ads). Other policies applied towards keywords may be designated as of type "K" (e.g., intrinsic properties (e.g., bad words, etc.), relationship between keywords and creatives for the adgroup, etc.) Policies applied towards the destination URL of a creative/criteria (i.e., the landing page) may be designated as of type "D" (e.g., relationship to Visible URL, relationship with keywords/creative-text, intrinsic properties of referenced page (it works, supports back button, popups/pop unders), ensuring the destination URL can be viewed in a standard browser (e.g., destination URL can be loaded into a browser without requiring installation of any special software), etc.). Policies applied towards the relationship between destination URL and creative may be designated as of type "L" (e.g., relevance). Finally, policies applied towards the product being advertised may be designated as of type "P" (e.g., often these are just reflected as suspicious keywords). The "Code to Check" field 840 may contain individualized code that is targeted towards implementing some policy, such as looking for violation patterns associated with bad word, bad punctuation, etc. It could have code that checks the destination URL to see if it works, if it has pop-ups, if the back button works, etc. The "Data for the Checker Function" field 845 is used to pass parameters (e.g., bad words, trademark violations, etc.) to policy checking functions. The "Data to Collect for Violation, and How to Auto-fill it" field 850 defines what to look at and what is being checked, such as the title or text of a creative, the destination URL, etc. The "Policy-Specific Language-independent Whitelist" field 855 contains whitelists, which are basically filters that allow a certain violation(s) to be ignored. Whitelists in field 855 have characteristics and information that is independent of the language used, but are applicable to specific policies. The "Policy-Specific Language-Centric Whitelists" field 860 is similar to field 855, just described above, with the only difference being that the whitelists are language dependent, such that each whitelist is applied to only one language.

In at least one embodiment consistent with the present invention, disapproval reasons may include one or more of the following: Need Appropriate Spacing, Superlatives, Repetition, Grammar, Pop-Up, Identify Affiliate Status, Spelling, URL Not Working, Lists must be introduced and contain punctuation, Promotional Language, Keyword trademark term, Offer not reflected within 1-2 clicks of landing page, Capitalization, Display URL not in destination domain, Unacceptable Content, Punctuation, Repetition in a row, Keyword does not meet Editorial Guidelines, Unacceptable Phrases, Ad Text Trademark Term, Back Button, Unacceptable Title Phrases, Keywords too general, Unacceptable content as keyword, Clarify Prescription Requirement, Keywords don't reflect adult content, Ad Text Price Not Reflected on Website, Display URL Field, Keyword relevance, Need Appropriate Spacing, an Ad Character Limit Violation, Lists must be introduced and contain punctuation, Display URL not in destination domain, Back Button, and Unacceptable Title Phrases. As can be appreciated from the foregoing list, many of the reasons for disapproval may occur at, and be checked at, an advertiser self-service front-end. At least some of these violations can be determined automatically, and should be pointed out to advertisers while they are provisioning their advertisement.

Naturally, different policies may be stored, and policies may be stored in different data structures.

§4.3.3 Exemplary Methods for Polity Auto Check

Figure 9:
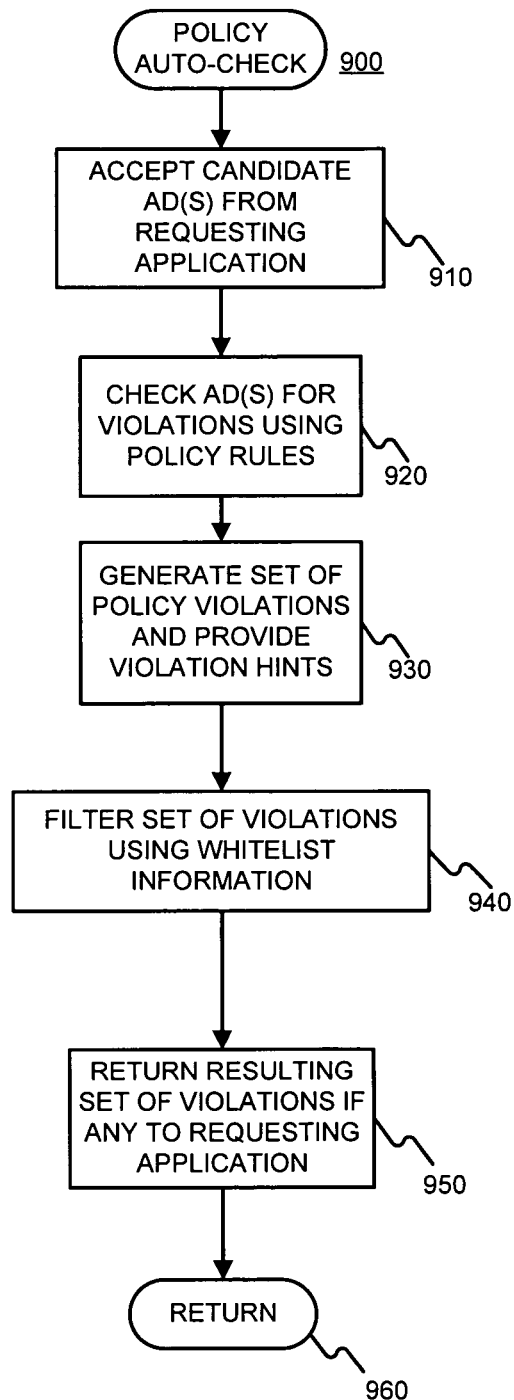
FIG. 9 is a flowchart illustrating an exemplary method that may be used to automatically apply ad policies to detect ad violations in a manner consistent with the present invention.

FIG. 9 is a flowchart illustrating an exemplary method 900 that may be used to automatically detect ad violations and return the results to the requesting systems for ad approvals in a manner consistent with the present invention. As introduced above, such a method may be used across a number of different operations such as advertiser self-service operations, ad delivery system customer service representative operations, auto-check operations, etc. The method 900 accepts one or more candidate ads from a requesting application. (Block 910) Then, the ad(s) are checked for violations using policy rules of the advertising system. (Block 920) After checking for violations, the method 900 may generate a set (which may be an empty set) of policy violations and provide violation hints. (Block 930) The set of violations may then be filtered using whitelist information. (Block 940) The resulting set of violations is returned to the requesting application. (Block 950).

Referring back to blocks 920 and 930, the method 900 may simply accumulate a list of policy violations and the violation text (Recall, e.g., fields 810, 815 and 820 of FIG. 8.) for a specific ad.

Referring back to block 940, whitelists are basically filters that allow one or more particular violations to be ignored. If the violations match the characteristics defined in the whitelists, they may be ignored. By using whitelists, the ad representatives can accept exemption requests from advertisers. If the exemption request is approved, the violation is added as a whitelist in the policy information; hence, any other ad from the same advertiser with the same violation will be accepted. In addition, the violation could be whitelisted such that any ad with the same violation regardless of the advertiser will be accepted as well. These whitelist policy rules and modifications may be tracked (e.g., using tables in databases that have such information as user ID, removal user ID, creation date, etc.). For instance, the whitelists may be stored in a table called policy rules containing all the necessary information for defining the whitelists and tracking changes. Given a list of policy violations for a specific ad (Campaign Id, Account Id, Customer Id, Language) tuple, the method 900 determines which whitelist exemptions apply.

In at least some embodiments consistent with the invention, the method 900 may perform a query to the policy information database, and receive a set a whitelists. Each violation may contain information such as the policy violated, which creative or criteria the violation applies to (referred to as "Entity"), and the violation text (referred to as "Text"). The method 900 finds the whitelists for that violated policy that matches the "Text". Further, in at least some embodiments consistent with the present invention, each whitelist has a value defining the maximum level for which the violation can be approved called "MaxFamilySatus". Also, each whitelist can have a 3-tuple (referred to as "Rule-Specificity") over the binary alphabet reflecting whether the whitelist specified the Campaign Id, Customer Id, and Language, respectively. For example, the specificity of a whitelist for just "Language=en_US" is (0,0,1) while the specificity for a whitelist for "Customer Id=Amazon and Language=en_US" is (0,1,1). Here the second whitelist is more specific than the first since the second whitelist is specified both by Language and Customer ID (the customer is Amazon and the language used is English-US) whereas the first is specified just by Language (language used is English-US). Campaign ID is the most specific, Customer ID is next in specificity, and Language is the least specific.

When whitelists for the violated policy that matches the Text have been found, the method 900 may also accumulate the MaxFamilyStatus values for each of the applicable whitelists (or applicable rules). Also the specificity of each of the applicable whitelists may be accumulated so that ties can be broken during sorting and filtering. As a result, at this point of the filtering process for each violation, an exemplary structure of the applicable whitelists (or applicable rules) may be as follows:

Violation=((Policy Id, Entity, Text), Rule-Specificity, Rule-MaxFamilyStatus).

The applicable whitelists may be reduced by selecting the most specific whitelists for each violation.

§4.3.4 Exemplary Apparatus

Figure 10:
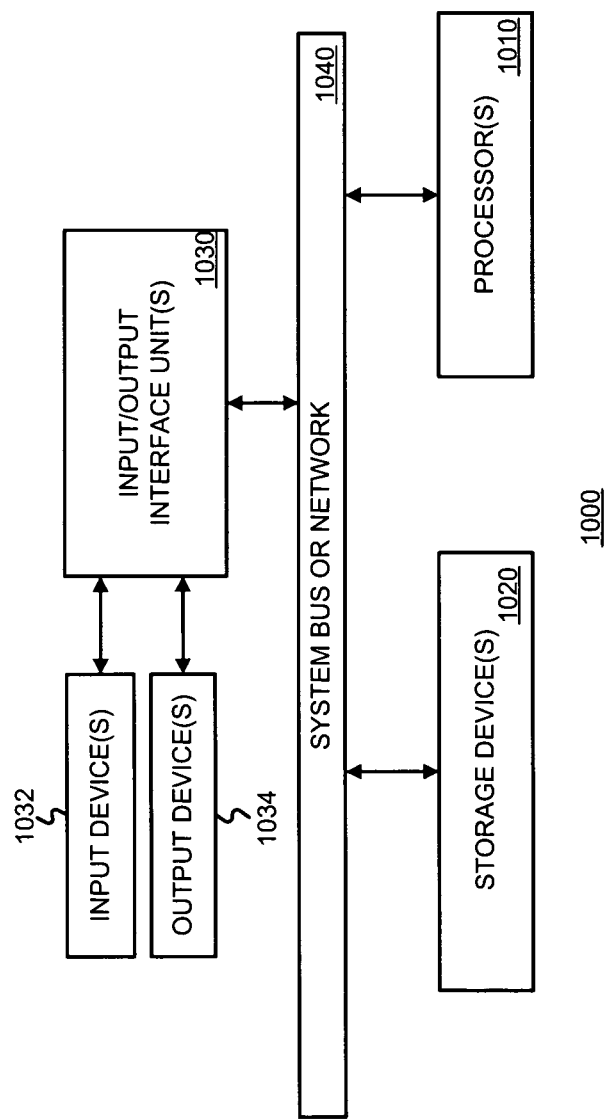
FIG. 10 is a block diagram of a machine that may perform one or more operations, and store information used and/or generated, in a manner consistent with the present invention.

FIG. 10 is block diagram of a machine 1000 that may perform one or more of the operations discussed above. The machine 1000 may include one or more processors 1060, one or more input/output interface units 1030, one or more storage devices 1050, and one or more system buses and/or networks 1040 for facilitating the communication of information among the coupled elements. One or more input devices 1010 and one or more output devices 1020 may be coupled with the one or more input/output interfaces 1030.

The one or more processors 1060 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 1050 and/or may be received from an external source via one or more input/output interface units 1030.

In one embodiment, the machine 1000 may be one or more conventional personal computers. In this case, the processing units 1060 may be one or more microprocessors. The bus 1040 may include a system bus. The storage devices 1050 may include system memory, such as read only memory (ROM) and/or random access memory (RAM). The storage devices 1050 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1010, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1060 through an appropriate interface 1030 coupled to the system bus 1040. The output devices 1020 may include a monitor or other type of display device, which may also be connected to the system bus 1040 via an appropriate interface. In addition to (or instead of) the monitor, the personal computer may include other (peripheral) output devices (not shown), such as speakers and printers for example.

The various operations described above may be performed by one or more machines 1000, and the various information described above may be stored on one or more machines 1000.

The present invention may be implemented in Java. Java inheritance and method overriding may be used to support the implementation of finding violations of policies. It may be a servlet that both automatically polls for new approval events that need review and supports an XML-based administrative and analysis application program interface. Work may be stored as entries in a database table data structure.

§4.3.5 Alternatives and Refinements

In at least some embodiments consistent with the present invention, hints or annotations may include one or more of red-text hint list, short-descriptions of likely violations, checkboxes for a "disapprove" dialog and for the "keyword disapproval reasons" dialog, a dynamic GUI to prompt for extra information as needed, javascript links to mark the checkboxes for each hinted violation (e.g., on both "disapprove" and "keyword disapproval reasons" dialogs), text of violations for customer-facing emails, etc.

In at least some embodiments consistent with the present invention, at least some policies applied in the context of an advertiser self-service front-end may be of the type "Warn." Warnings may be used to ask the advertiser to request an exception to the policy. For example, when the capitalization policy is violated by an acronym "SPCA", a warning may be communicated to the advertiser. I response, the advertiser might explain: "SPCA is an acronym for the Society for the Prevention of Cruelty to Animals." These annotations may be tracked and can be used to facilitate entry of advertiser-specific whitelists.

In at least some embodiments consistent with the present invention, instead of immediately disabling (or not enabling) a disapproved ad, at least some embodiments consistent with the present invention may provide the advertiser with a "grace period" in which to remedy the policy violation before the ad is disabled. Whether or nor a grace period is provided, and perhaps the length of the grace period may depend on the specific violation.

In at least some embodiments consistent with the present invention, The processing of live ads may be deterministic, but may be skewed toward those ads for which policy compliance is deemed most important (e.g., those that are clicked through most often). Using this strategy, an ad delivery system can best protect its brand and user experience.

In at least some embodiments consistent with the present invention, actions upon ad disapproval may depend, at least to some degree, on the advertiser or type of advertiser (e.g., an important advertiser, a trusted advertiser, etc.). For example, for important advertisers and/or trusted advertisers disapproval messages (e.g., emails) may be sent to an ad delivery system customer service representative instead of directly to the advertiser. As another example, important advertisers and/or trusted advertisers may be given a grace period (that would not ordinarily be given), or a longer than normal grace period to remedy certain policy violations.

In at least some embodiments consistent with the present invention, approval judgments, and/or the basis for such approvals may be tracked. If an ad cannot be auto-approved, an identifier of the ad may be saved so that it is not re-investigated later.

In at least some embodiments consistent with the invention, the advertising system uses a server designed to examine landing pages. This server may perform dynamic analysis of requests and responses to and from landing pages' web servers. The analysis could examine the request/response pairs to verify such properties as whether a landing page contains pop-ups, or whether it disables the browser's back button. The server could also perform a static analysis of the contents of the destination page and any code that it references to determine for example, if it contains material not approved by the policies.

Further concerning ad landing pages, it may be useful to keep a copy of the entire last-fetched landing pages. Estimates have shown that a few Gigabytes are required to store all of the embedded images, style-sheets, and java-script so that the landing pages of the ads in the approval bin can be presented to an ad customer representative again entirely off-line. This cached data can be used by ad customer representatives as well as the auto-check approval system to improve performance of checking ad landing pages by significantly reducing latency time.

Many of the ad landing pages are reused by a number of different ads. Because of this redundancy and the need to store extra information for each ad landing page to provide persistent policy validation, ads with common landing pages can all be associated with an ad landing page ID and checked collectively. This serves as a more efficient method of applying persistent policy validation because the system can simply process all ads sharing the same landing page collectively. For example, a database table may be provided with an ad landing page ID primary key of the table, and a list of all ads that use the page as their landing page.

§4.4 Illustrative Examples of Operations in an Exemplary Embodiment

Since the auto policy check operations may be used by various other operations for automating ad approvals, a brief example of how such operations might operate is presented below.

Consider the four policies applicable to an advertising system:

C1—no repetition
C2—no exclamation points
C3—no trademarks
K1—no repetition keywords Now consider a new ad submitted by customer "Yahoo!" with creative text as follows:

Yahoo! Really in Bora Bora
Great prices, lots of fun!
Scenery, scenery, scenery.
www.yahoo.com/borabora.html And these related targeting keywords:
"Travel scenery"
"bora bora"

Upon submission of this ad, the auto policy check in the advertising system might act according to the method 900 of FIG. 9. The initial application of the policies in this example would give the list of violations as follows (where V1, V2, V3, etc. are violations):

V1—(C1, creative-line-1, "Bora Bora")
V2—(C1, creative-line-3, "Scenery, scenery, scenery")
V3—(C2, creative-line-1, "Yahoo!")
V4—(C2, creative-line-2, "fun!")
V5—(C3, creative-line-1, "Yahoo!")
V6—(K1, keyword#2, "bora bora")

According to violation one (V1) the policy violation is C1, meaning that there is a repetition of a word somewhere in the creative. The repetition has occurred at creative-line-1, meaning that the violation has occurred at line one of the creative. Similarly, the last piece of information provided in the quotation marks ("Bora Bora") is the text in the creative that is in violation with the policy rule. According to violation two (V2) the policy violation is C1, meaning that there is a repetition of a word somewhere in the creative. The repetition has occurred at creative-line-3, meaning that the violation has occurred at line three of the creative. Similarly, the last piece of information provided in the quotation marks ("Scenery, scenery, scenery") is the text in the creative that is in violation with the policy rule. According to violation three (V3) the policy violation is C2, meaning that there is an exclamation point used somewhere in the creative. The exclamation point has occurred at creative-line-1, meaning that the violation has occurred at line one of the creative. Similarly, the last piece of information provided in the quotation marks ("Yahoo!") is the text in the creative that is in violation with the policy rule. According to violation four (V4) the policy violation is C2, meaning that there is an exclamation point used somewhere in the creative. The exclamation point has occurred at creative-line-2, meaning that the violation has occurred at line two of the creative. Similarly, the last piece of information provided in the quotation marks ("fun!") is the text in the creative that is in violation with the policy rule. According to violation five (V5) the policy violation is C3, meaning that a trademark has been used somewhere in the creative. The trademark has occurred at creative-line-1, meaning that the violation has occurred at line one of the creative. Similarly, the last piece of information provided in the quotation marks ("Yahoo!") is the text in the creative that is in violation with the policy rule. Finally, according to violation six (V6) the policy violation is K1, meaning that a word entered as a keyword had been repeated. The word repetition has occurred at keyword#2, meaning that the repeated word has occurred in the second keyword. Similarly, the last piece of information provided in the quotation marks ("bora bora") is the text entered as a keyword that is in violation with the policy rule.

Assume that the policy information has the following whitelists:

W1—(C1, customer=*, account=*, campaign=*, language=en_US, FamilySafe, "Bora Bora")
W2—(C2, customer=*, account=*, campaign=*, language=en_US, FamilySafe, "Yahoo!")
W3—(C3, customer=yahoo, account=*, campaign=*, language=*, FamilySafe, "Yahoo!")
W4—(C3, customer=google, account=*, campaign=*, language=*, FamilySafe, "Goal! Goal! Goal!")
W5—(C2, customer=yahoo, account=*, campaign=*, language=en_US, FamilySafe, "Yahoo!")

Of course the above whitelists are just illustrations of an exemplary data structure. Note, that the asterisk followed after some of the parameters included in the above whitelist simply indicates that those parameters are independent of a specific type or id. For example, customer=* means that the customer of the ad could be anyone such as, Google, Yahoo, Amazon, etc. The whitelist would apply to anyone of them.

According to the method 900 of FIG. 9, for this campaign the search for selecting applicable whitelist rules would find W1, W2, W3 and W5 as applicable whitelist rules. Whitelist W4 would not be selected since the text (Goal! Goal! Goal!) does not mach with any of the violations. Further, a remaining whitelist rules may be sorted by specificity and take the most specific rule for a given violation. The results would be as follows:

V1—W1 matches
V2—None
V3—W2, W5 match
V4—None
V5—W3 matches

From the above results it is observed that V3 is the only violation with multiple matches, W2 and W5. However, W5 is more specific because it was specified both for customer and for language, thus its FamilyStatus of FamilySafe applies. Consequently, violations V1, V3, and V5 will be filtered out since they are whitelisted as FamilySafe, leaving violations V2 and V4 as the only remaining violations. These results are made available to any approval system making a request.

If the violations V2 and V4 of policies C1 and C2 have descriptions, improvement suggestions, and external links, the following hints may be provided.

"Scenery, scenery, scenery" in line 3 violated a policy against repetitive text. Please remove the repetitive words. Click HERE for more information.

"fun!" in line 2 violates a policy against superlatives. Please remove exclamation. Click HERE for more information.

As can be appreciated by the foregoing example, the auto policy check operations have many potential uses. For example, useful feedback can be provided to advertisers to help them make their ad compliant with policies of the ad delivery system. As another example, many tedious and error-prone tasks are automated for customer representatives.

§4.4 Conclusions

As can be appreciated from the foregoing disclosure, embodiments consistent with the present invention can be used to automatically test ads submitted by advertisers against advertising systems policies, rather than using cumbersome, expensive, slow, and error-prone manual reviews ads submitted by an advertiser, with the resultant delay in putting those ads into circulation or syndication. By automating the approval process and enforcement of the systems policies, efficiency is improved resulting in faster turnaround time for approving ads that ultimately result in reduced cost and increased ad impressions. Though parts of the test process are automated, humans may be given the ultimate control as to what can be approved, and may aid the system in improving its operations. Automated policy checks further ensure the quality of the ads, to minimize the chance of inappropriate or incorrect ads being placed into circulation or syndication, or having inappropriate landing pages.

What is claimed is:

1. A computer-implemented method for improving advertisement approval, the method comprising:
    a) accepting an advertisement, by an automated ad policy checking component of a computer system including at least one computer, for use with an online ad serving system;
    b) automatically checking, by the automated ad policy checking component and without manual human intervention, the advertisement for compliance with one or more policies of the online ad serving system; and
    c) determining, by the automated ad policy checking component and without manual human intervention, whether or not to approve the advertisement using results of the automatic checking.

2. The computer-implemented method of claim 1 wherein the advertisement includes a link to a landing page, and wherein the follow up check tests the landing page for compliance with policies.

3. The computer-implemented method of claim 2 wherein the policies include at least one of (A) ensuring that the ad landing page generates no pop-ups, and (B) ensuring that the ad landing page does not disable a "back" operation in a browser.

4. The computer-implemented method of claim 1 wherein if it was determined to approve the advertisement, then further time stamping, by the automated ad policy checking component, the advertisement to facilitate a follow up check of the advertisement.

5. The computer-implemented method of claim 4 wherein the advertisement includes a link to a landing page, and wherein the follow up check tests the landing page for compliance with policies.

6. The computer-implemented method of claim 5 wherein the policies include at least one of (A) ensuring that the ad landing page generates no pop-ups, and (B) ensuring that the ad landing page does not disable a "back" operation in a browser.

7. The computer-implemented method of claim 1 further comprising:
    d) if it was determined not to approve the advertisement, then providing, by the automated ad policy checking component, hints for making the ad comply with one or more violated policies to at least one of (A) an advertiser associated with the ad, and (B) an ad serving system customer service representative.

8. The computer-implemented method of claim 7 wherein the hints are provided in an e-mail message.

9. The computer-implemented method of claim 7 wherein the hints are provided in a dynamically generated page loaded into a browser.

10. The computer-implemented method of claim 1 wherein, each of the one or more policies includes (A) a 3 policy identifier, and (B) a policy description; wherein each of the one or more policies further includes 3 (C) a suggestion for avoiding a violation of the policy.

11. The computer-implemented method of claim 1 wherein, each of the one or more policies includes (A) a 3 policy identifier, and (B) a policy description; wherein each of the one or more policies further includes (C) a link, executable by an ad delivery system customer service representative but not by an advertiser, to further information about the policy.

12. The computer-implemented method of claim 1, further comprising:
    d) if it was determined not to approve the advertisement, then
        i) advising, by the automated ad policy checking component, the advertiser of one or more reasons that the ad was not approved,
        ii) permitting, at least initially and by the automated ad policy checking component, the advertisement to be served by the ad serving system during a grace period, and
        iii) inhibiting, at least initially and by the automated ad policy checking component, the serving of the advertisement by the ad serving system after expiration of the grace period if policy violations remain.

13. The computer-implemented method of claim 1, further comprising:
    d) determining, by the automated ad policy checking component, whether the advertiser is a trusted advertiser, and
    e) if the advertiser is a trusted advertiser
        i) advising, by the automated ad policy checking component, the advertiser of one or more reasons that the ad was not approved,
        ii) permitting, by the automated ad policy checking component, the advertisement to be served by the ad serving system during a grace period, and
        iii) inhibiting, by the automated ad policy checking component, the serving of the advertisement by the ad serving system after expiration of the grace period if policy violations remain.

* * * * *